United States Patent
Voitic et al.

(10) Patent No.: US 9,605,538 B2
(45) Date of Patent: Mar. 28, 2017

(54) CUTTING PICK TOOL

(71) Applicant: SANDVIK INTELLECTUAL PROPERTY AB, Sandviken (SE)

(72) Inventors: Hannes Voitic, Steiermark (AT); Joseph Fader, Marietta, GA (US); Alfred Lammer, Zeltweg (AT); Kenneth Monyak, Abingdon, VA (US); Steven Weaver, Amsterdam (NL)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/594,358

(22) Filed: Jan. 12, 2015

(65) Prior Publication Data

US 2015/0198040 A1 Jul. 16, 2015

Related U.S. Application Data

(60) Provisional application No. 61/926,423, filed on Jan. 13, 2014.

(51) Int. Cl.
| | |
|---|---|
| E21C 35/183 | (2006.01) |
| B23K 1/00 | (2006.01) |
| B23K 1/19 | (2006.01) |
| B23K 1/20 | (2006.01) |
| E21C 35/18 | (2006.01) |

(52) U.S. Cl.
CPC .......... *E21C 35/183* (2013.01); *B23K 1/0008* (2013.01); *B23K 1/19* (2013.01); *B23K 1/20* (2013.01); *E21C 2035/1806* (2013.01); *E21C 2035/1816* (2013.01)

(58) Field of Classification Search
CPC .................. E21C 35/18; E21C 35/183; E21C 2035/1806; E21C 2035/1809; E21C 2035/1813; E21C 2035/1816; E21C 2035/1803
USPC .................. 299/100–101, 105, 113, 110–111
See application file for complete search history.

(56) References Cited

U.S. PATENT DOCUMENTS

| | | | | |
|---|---|---|---|---|
| 3,342,532 A | * | 9/1967 | Krekeler | ................ E21C 35/19 175/413 |
| 4,502,734 A | * | 3/1985 | Allan | ..................... B28D 1/265 175/413 |
| 4,702,525 A | * | 10/1987 | Sollami | ................ E21C 35/183 299/111 |
| 2006/0272790 A1 | | 12/2006 | Weaver | |
| 2009/0256413 A1 | * | 10/2009 | Majagi | ................... B28D 1/188 299/100 |
| 2010/0007192 A1 | * | 1/2010 | Majagi | ..................... B22F 7/062 299/79.1 |

(Continued)

FOREIGN PATENT DOCUMENTS

| | | | |
|---|---|---|---|
| DE | 3431888 A | * | 3/1985 |
| GB | 1114156 A | * | 5/1968 |

(Continued)

*Primary Examiner* — Sunil Singh

(74) *Attorney, Agent, or Firm* — Corinne R. Gorski

(57) ABSTRACT

A cutting pick tool including a cemented carbide support body that mounts a diamond composite cutting tip. The support body includes a recess having a conical region that mounts a complementary conical shaped mount portion of the tip. The components are brazed together to provide a secure and robust cutting tip region.

16 Claims, 6 Drawing Sheets

(56) References Cited

U.S. PATENT DOCUMENTS

2012/0242136 A1* 9/2012 Ojanen ................. E21C 35/183
                                                        299/105
2014/0054951 A1* 2/2014 Bookhamer .......... E21C 35/183
                                                        299/113
2015/0035343 A1* 2/2015 Ojanen ................. B28D 1/186
                                                        299/105

FOREIGN PATENT DOCUMENTS

| GB | 2493282 A | | 1/2013 |
|----|-----------|---|--------|
| RU | 2083821 C1 | * | 7/1997 |
| WO | 93/25795 | | 12/1993 |
| WO | 01/88322 | | 11/2001 |

* cited by examiner

CUTTING PICK TOOL

RELATED APPLICATION DATA

This application claims priority under 35 U.S.C. §119 to U.S. Provisional Patent Application No. 61/926,423 filed on Jan. 13, 2014, which the entirety thereof is incorporated herein by reference.

TECHNICAL FIELD

The present disclosure relates to a cutting pick tool having a diamond composite based cutting tip supported at a cemented carbide support body, and in particular, although not exclusively, to a pick tool in which the mounting region between the cutting tip and support body is optimised to minimise stress concentrations and fatigue of the cutting tip and support body during use.

BACKGROUND

Rock cutting and excavation machines have been developed for various specific applications including mining, trenching, tunnelling, foundation drilling, road milling, etc. Typically, a drive body in the form of a rotatable drum or drill head comprises a plurality of replaceable cutting bits that provide the points of contact for the material or mineral face.

The term cutting bit typically refers to a pointed or chisel shaped cutting tool that acts to cut rock by penetrating and scraping along the rock surface. The tool, also referred to as a pick, drag-tool or cutting tool, commonly has a steel shank provided with a cutting tip that may be formed from tungsten carbide, a polycrystalline diamond composite (PDC) or silicon carbide-diamond (SCD) composite.

In one implementation, a mobile mining machine comprises a rotating cutting head with bit holders for mounting and orientating the cutting bits to strike the rock at a desired angle of attack. The cutting bits are arranged specifically on the rotating drums to work cooperatively and to follow one another to facilitate the rock fragmentation via a minimum energy input.

Many different processes and arrangements have been proposed for attachment of the super-hard diamond cutting tips to the shank of the cutting tool. As will be appreciated, the bond between the diamond composite and the tool support body is required to be sufficiently strong to withstand the significant forces transferred through the tool during the repeated and continuous cutting operations. In some instances, the tip may be bonded directly to the pick body by brazing or soldering. WO 93/25795; WO 01/88322; US 2006/0272790 and WO 2011/089117 disclose cutting tools in which a diamond composite tip is bonded to a support body by brazing. An alternative bonding method is described in GB 2493282 in which the PCD composite tip is fused to a support structure by pressing the two components together at ultra-high pressure and temperature.

However, conventional arrangements and assembly methods are not optimised to allow a cutting tool to be manufactured conveniently, efficiently and economically whilst providing a tool that is capable of withstanding the significant loading and stress forces during cutting so as to ensure the cutting tip is not dislodged from the tip holder.

SUMMARY

It is an objective of the present disclosure to provide a cutting pick tool and a method of manufacturing the same in which a super-hard cutting tip is secured efficiently and effectively at a support body via optimised mounting of the tip to withstand the significant loading and stress forces encountered during cyclical cutting actions. It is a further specific objective to provide a pick tool that is economically efficient to manufacture and does not necessitate ultra-high pressures and temperatures without compromising the bond strength between the components of the tool.

It is a further specific objective to provide a cutting tool that minimises the volume of the diamond based composite material whilst maintaining the effectiveness of the tool to withstand the compressive, tensile, shear and stress forces within the bit during cutting.

The objectives are achieved by providing a pick tool in which a super-hard diamond based composite, typically a silicon carbide-diamond (SCD) is bonded to a cemented carbide support body via a male and female coupling arrangement. The carbide support body is formed as a composite material in which carbide particles represent an aggregate and a metallic binder provides a matrix that encapsulates the particles.

In particular, the cemented carbide support body comprises a recess having a shape and configuration that is optimised to allow secure and effective seating of the complementary shaped SCD tip with the two components bonded via a braze layer. Preferably, the braze layer comprises a different metal binder material as the composite support body. Alternatively the braze layer may comprise the same metal material as the composite support body. The support body recess and a rearwardly projecting mount portion of the tip comprise complementary conical sections that nestle together in close touching contact such that approximately half or just less than half of the volume of the cutting tip is accommodated within the recess. The conical shaped interface or boundary region is particularly advantageous to minimise stress concentrations resultant from the impact forces as the tool strikes the rock face and to withstand lateral (or side) loading forces that may facilitate tip detachment.

According to specific embodiments, the tool strength and effectiveness to withstand the loading forces is provided and/or enhanced by the specific angular orientation of the sidewall that defines the recess relative to the longitudinal axis of the tool and/or a base surface or trough of the recess. Accordingly, the cutting tool is prevented from rotating in an axis aligned perpendicular to the longitudinal axis of the cutting tool resultant from side impact loading forces. The relative depth and angle of the conical sidewall is optimised so as not to compromise the integrity of the support body and to minimise stress concentrations that may otherwise result from an angular recess shape profile.

According to a first aspect there is provided a cutting pick tool including a cutting tip of a diamond composite, the tip having a mount portion extending axially rearward; a cemented carbide support body having an axially forward region and an axially rearward region mounted at a steel pick body; the support body having a recess extending axially rearward from the forward region, the mount portion received and mated within the recess; the recess being defined by a conical sidewall that tapers radially inward in a direction from the forward to the rearward region and towards a central axis; and the mount portion having a complementary truncated conical shape profile to seat within the recess.

Optionally, an axial depth D of the recess in an axial direction of the tool is in a range 20 to 30% of a total axial length of the support body. Such an arrangement is advantageous to provide a desired level of mechanical securement of the tip at the support body without compromising or weakening the support body by removing material to form the recess.

An angle by which the sidewall tapers radially inward relative to the central axis can be in the range 10 to 70°, 20 to 40° or 25 to 35°. Such an arrangement provides a wedging effect of the tip within the support body such that the angular disposition of the sidewall relative to the planar base surface prevents the tip from being deflected by lateral loading forces encountered by the tip during use. The angle of the sidewall is also optimised to maintain the structural integrity of the support body immediately surrounding the tip such that the support body does not fracture due to loading and stress forces. An appreciable volume of material of the support body is therefore present around the rearward mount portion of the tip.

Optionally, a forward region of the tip includes a domed apex and is generally conical being defined by a cone surface, an angle of the cone surface relative to the axis being at least equal to or greater than an angle by which the sidewall of the recess tapers radially inward relative to the axis. The shape profile of the apex is optimised to provide cutting without compromising the structural integrity of the tip to undesirably shorten the operational life-time of the tool. The relative angular alignment of the cone surface and the angle by which the sidewall of the recess tapers is configured to optimise the strength of securement of the tip within the support body and to ensure an appreciable volume of the tip is exposed and projects forwardly from a forward-most region of the support body. Axial separation of the forwardmost region of the support body and the apex of the tip minimises wear at the support body as substantially all of the cutting action is provided by the tip.

Optionally, a rearward end of the sidewall terminates at a substantially planar base surface. The base surface is aligned perpendicular to the longitudinal axis and this is advantageous to provide a secure mount for the tip and to optimise the mechanical locking of the tip at the support body. The angular alignment of the base surface that defines the recess relative to the sidewalls of the recess is optimised to provide a secure mount for the tip and to increase the surface area contact between the tip mount portion and the mating surface of the recess. The planar base surface in conjunction with the sidewalls of the recess, prevent dislodgement of the tip against both axial and lateral loading forces during cutting.

An annular junction between the rearward end of the sidewall and the base surface can curved to provide a gradual transition from the sidewall to the base surface being devoid of an edge or sharp angled portion. The curved junction is beneficial to minimise stress concentrations at this region of the support body without compromising the mechanical fixation of the tip.

Advantageously, the tool has a bonding braze layer positioned between the cutting tip and the support body. The tool further includes a bonding braze layer positioned between the support body and the steel pick body. The braze material is metallic and may be a different material that forms the matrix of the cemented carbide support body. Alternatively, a metallic material being different than the carbide matrix may be employed. The bonding braze layer between the tip and support body and optionally between the support body and the steel pick body served to provide a secure attachment of the components of the tool and to avoid premature detachment. The braze layer is advantageous over alternative methods of attachment in which the various components of the tool are co-formed in situ. Utilising a braze layer enables independent construction of the tip, support body and pick body that may then be conveniently assembled to form the composite tool.

Optionally, 55 to 65% of the cutting tip projects axially forward from the support body. This volume of the axially forward projecting tip is advantageous to maximise the cutting action of the tip whilst providing a sufficiently robust mechanical of attachment of the tip to the support body.

Optionally, an external surface that defines the forward region of the tip is aligned substantially coplanar with an external surface that defines the forward region of the support body. Such an arrangement is advantageous to provide a seamless transition between the support body and the tip and accordingly avoid regions of the tool that may catch the rock face and lead to accelerated wear of the tool.

According to a second aspect, there is provided a method of manufacturing a cutting pick tool comprising: forming a diamond composite into a cutting tip, the tip having a mount portion extending axially rearward; providing a recess within a cemented carbide support body having an axially forward and rearward region, the rearward region mounted at a steel pick body, the recess extending rearwardly from the forward region and having a shape and configuration to receive the mount portion; forming the recess with a conical sidewall that tapers radially inward towards a central axis of the tool in a direction from the forward region to the rearward region; and bonding the tip to the support body by brazing.

The tip is bonded to the support body by brazing before the support body is mounted and/or bonded to the steel pick body. Such an assembly process is both convenient and is advantageous to maximise the braze bond strength between the tip and support body without compromising the integrity or damaging the steel pick body.

The method further includes bonding the support body to the steel pick body by brazing. Brazing the modular components of the tool together has been found to provide a secure mechanical attachment without compromising the integrity of each individual component of the tool.

According to a third aspect there is provided a cutting machine including a plurality of pick tools.

According to a further aspect there is provided a cutting pick tool including a cutting tip of a diamond composite, the tip having a mount portion extending axially rearward; a cemented carbide support body having an axially forward support region and an axially rearward region mounted at a steel pick body; the support body having a recess extending axially rearward from the forward region, the mount portion received and mated within the recess; wherein the recess is defined by a part- (or semi-) spherical sidewall; the mount portion of the tip having a complementary part- (or semi-) spherical shaped profile to seat within the recess; and a braze layer provided between the tip and the support body.

Reference within the specification to 'part- and semi-spherical' encompasses half-spherical and an incomplete volume of a sphere being greater or less than half the volume of sphere. Optionally, the tip is spherical.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
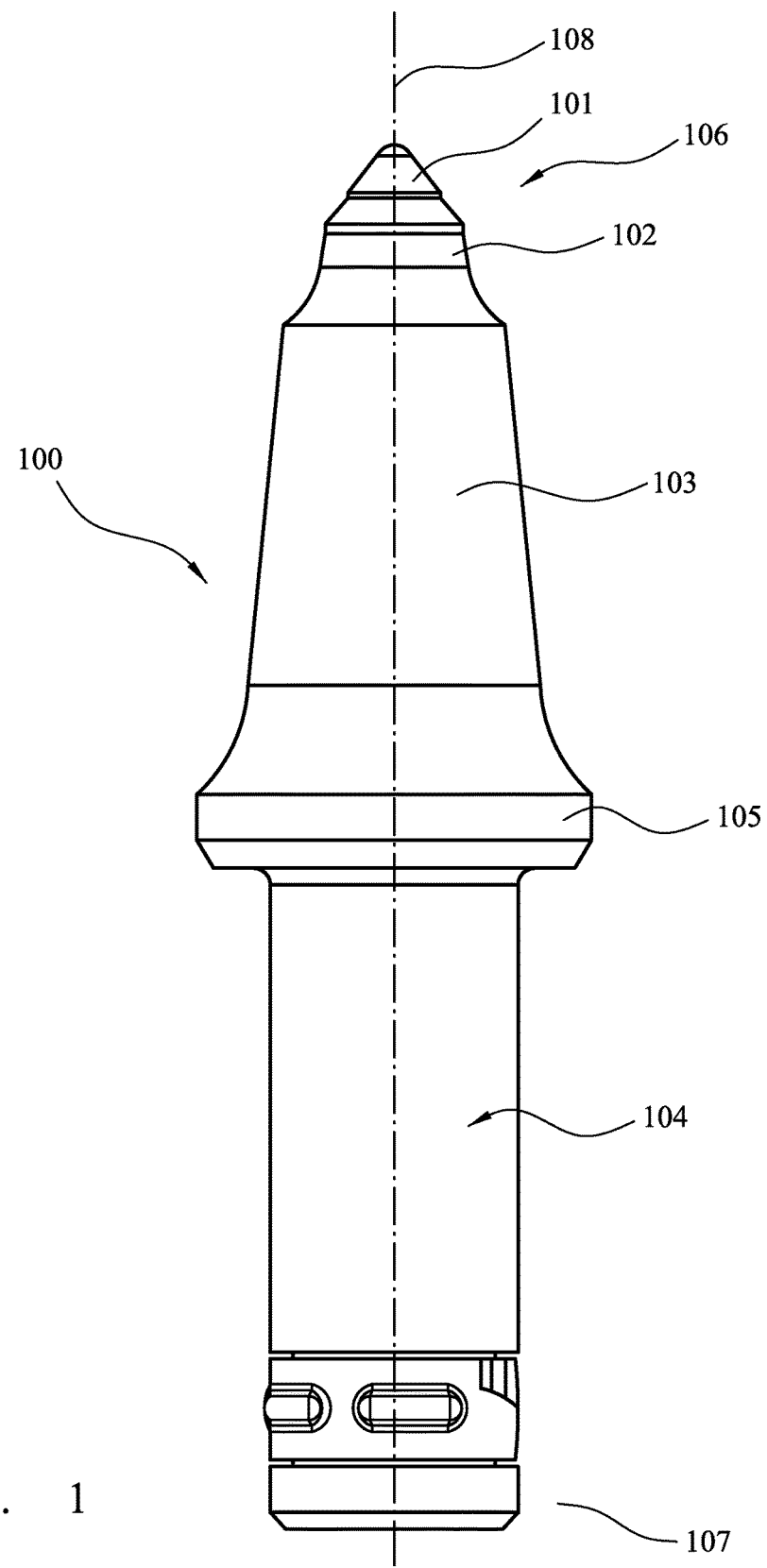
FIG. 1 is an external view of a cutting tool according to a first embodiment including a diamond composite cutting tip supported at a cemented carbide support body that is in turn mounted at a steel holder.

Referring to FIG. 1, a cutting pick tool 100 includes a super-hard diamond based composite, for example, silicon carbide-diamond (SCD) composite cutting tip 101 provided at a first end 106 via a male and female coupling arrangement and bonded to a cemented carbide support body 102 that is in turn bonded to a steel pick body 103. The carbide support body is formed as a composite material in which carbide particles represent an aggregate and a metallic binder provides a matrix that encapsulates the particles. The pick body 103 has a radially flared skirt 105 and a shank 104 extending axially rearward from skirt 105 towards a second end 107 of tool 100. Tip 101, support body 102 and pick body 103 are centered around a longitudinal axis 108 extending centrally through the cutting tool 100.

Figure 2:
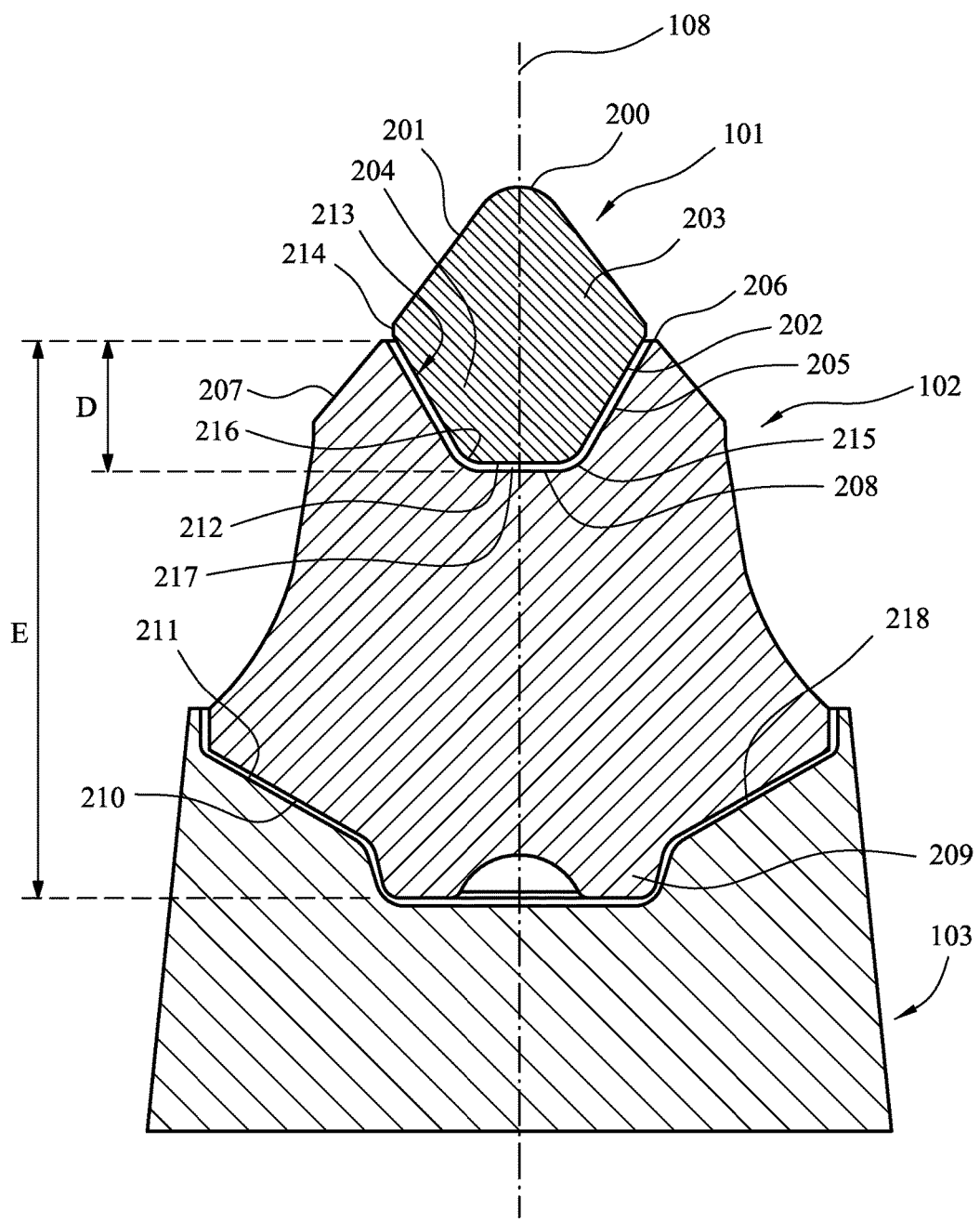
FIG. 2 illustrates a cross-section through the tip region of the cutting tool of FIG. 1.
Figure 3:
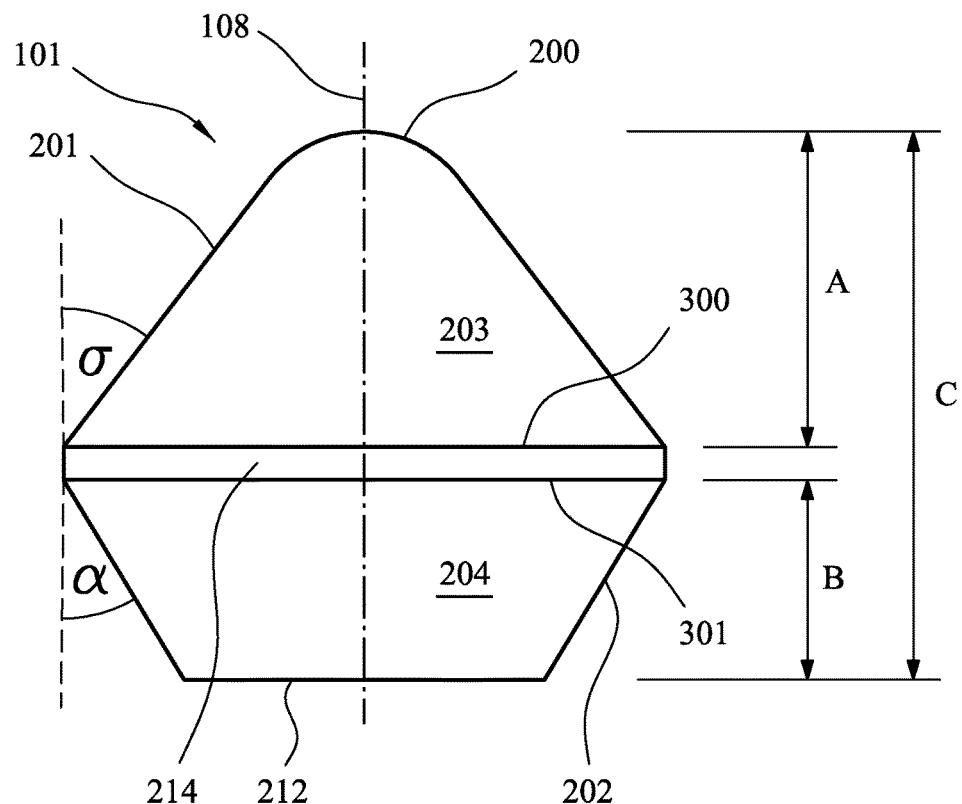
FIG. 3 is an external perspective view of the super-hard diamond based tip of FIG. 2.
Figure 4:
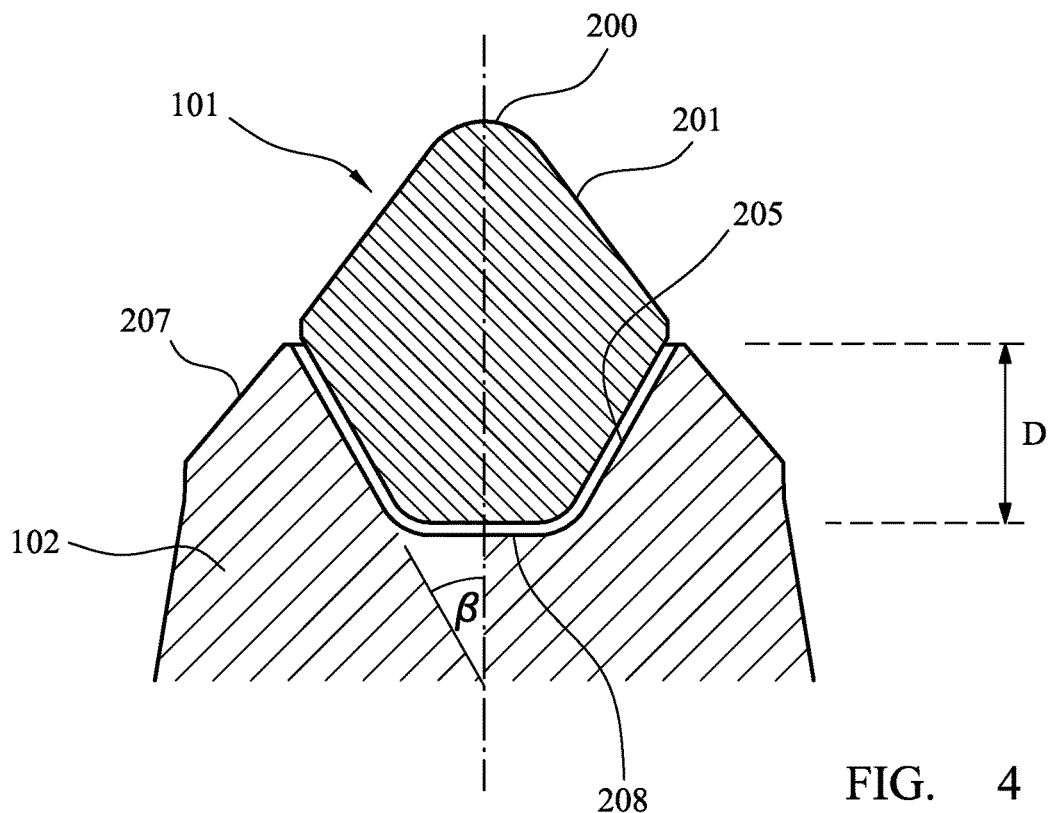
FIG. 4 is an enlarged cross-sectional view of the tip region of the cutting tool of FIG. 2.

Referring to FIGS. 2 to 4, the SCD tip 101 includes an axially forward region 203 and an axially rearward region that represents a mount portion 204 of tip 101. Forward region 203 has a generally conical shaped configuration having a domed tip end 200 that represents an axially forwardmost part of the tool 100. Mount portion 204 similarly has a conical shape configuration and is defined by surface 202 that tapers axially rearward towards axis 108 form a waist region 214 that represents a largest diameter portion of tip 101. Axially forwardmost conical region 203 is defined by a corresponding external surface 201 that is aligned substantially coplanar with an external surface 207 of support body 102 that extends axially rearward from an axially forwardmost rim 206 of support body 102.

Tip mount portion 204 is received and embedded within a recess (indicated generally by reference 213) that extends axially rearward from the annular forwardmost rim 206 of support body 102. Recess 213 has a complementary conical shape profile and is defined by sidewall 205 that also tapers radially inward from annular rim 206 towards axis 108. A trough or axially rearwardmost region of recess 213 is defined by a substantially planar surface 208 at which terminate the tapered recess sidewall 205. Surface 208 has a generally circular shaped profile and is bordered at its perimeter by an annular curved section 215 that forms a junction with the tapered recess sidewall 205. Similarly, an axially rearwardmost part of tip 101 is defined by a substantially planar end surface 212. A corresponding curved annular section 216 is provided at the junction between the planar circular surface 212 and the conical external surface 202 of tip mount portion 204.

According to the present disclosure, the shape profile and configuration of the tip mount portion 204 is complementary and corresponds to the shape profile and configuration of recess 213. As such, tip surfaces 202, 212 are configured for positioning in close touching contact with recess wall 205 and base surface 208 respectively, such that approximately half or just less than half of the volume of the cutting tip is accommodated within the recess. This configuration and the corresponding curved sections 215, 216 are advantageous to minimise stress concentrations at the axially forwardmost region of the support body 102 that surrounds recess 213.

As shown, a forward region of the tip includes a domed apex and is generally conical being defined by a cone surface, an angle of the cone surface relative to the axis being at least equal to or greater than an angle by which the sidewall of the recess tapers radially inward relative to the axis. The relative angular alignment of the cone surface and the angle by which the sidewall of the recess tapers is configured to optimise the strength of securement of the tip within the support body and to ensure an appreciable volume of the tip is exposed and projects forwardly from a forwardmost region of the support body. Optionally, 55 to 65% of the cutting tip projects axially forward from the support body.

A rearward end of the sidewall terminates at a substantially planar base surface. The base surface is aligned perpendicular to the longitudinal axis and this is advantageous to provide a secure mount for the tip and to optimise the mechanical locking of the tip at the support body. The angular alignment of the base surface that defines the recess relative to the sidewalls of the recess is optimised to provide a secure mount for the tip and to increase the surface area contact between the tip mount portion and the mating surface of the recess. The planar base surface in conjunction with the sidewalls of the recess, prevent dislodgement of the tip against both axial and lateral loading forces during cutting.

An annular junction between the rearward end of the sidewall and the base surface can curved to provide a gradual transition from the sidewall to the base surface being devoid of an edge or sharp angled portion. The curved junction is beneficial to minimise stress concentrations at this region of the support body without compromising the mechanical fixation of the tip.

The cemented carbide support body 102 further includes an axially rearward region 209 having an axially rearward facing surface 210. Support body surface 210 is positioned opposed to an axially forward facing surface 211 of the steel pick body 103.

The SCD tip 101 is bonded to the cemented carbide support body 102 via a braze layer 217 that extends continuously (near continuously or at least partially) between the opposed tip surface 202, recess wall 205 and planar surfaces 212, 208. The braze layer 217 also extends between the axially forwardmost rim 206 of support body 102 and the waist 214 of tip 101. A relative volume and thickness of the braze layer 217 is suitable to provide a secure bond and prevent detachment of tip 101 from support body 102. Additionally, the support body rearward region 209 is bonded to the axially forward region of the steel pick body 103 by a similar braze layer 218 of sufficient volume and thickness to provide a secure bond.

The braze layers 217, 218 are a metallic material suitable to bond the SCD tip 101 to the cemented carbide support body 102 and the support body 102 to the steel pick body 103. For example, the braze material may have any suitable metal based material and may be different to the material binder that serves as the matrix for the aggregate carbide particles that together represent the metal matrix composite of the cemented carbide support body 102. Importantly to achieve the required bonding strength between the component 101, 102 and 103, each component is preformed and then bonded together via a brazing process in which the molten braze metal is introduced into the cavity or gap regions provided respectively between the tip 101, support body 102 and pick body 103. The secure attachment of the components 101, 102 and 103 may be enhanced by an optional shrink-fitting process. The brazing process employed for the subject disclosure is in accordance with known procedures and would be understood by those skilled in the art.

The tip region of the present pick tool is optimised to reduce stress concentrations at the bonding region between the tip 101 and the support body 102 whilst providing a solid mechanical coupling of the tip 101 to the support body 102. In particular, an axial length by which tip 101 is embedded within support body 102 is optimised for mechanical strength such that tip 101 is resistant to dislodgement from support body 102 due to significant impact loading forces at tip surface 201 during cutting. A depth of recess 213 is also optimised to minimise any weakening of the mechanical strength of the support body 102 due to the removal of material by formation of recess 213. In particular, an axial depth D of recess 213 is defined between the axially forwardmost rim 206 and base surface 208. The total axial length E of support body 102 is defined between the axially forwardmost rim 206 and an axially rearwardmost part of surface 210. The axial depth D of the recess in an axial direction of the tool is in a range 20 to 30% of a total axial length of the support body. Such an arrangement is advantageous to provide a desired level of mechanical securement of the tip at the support body without compromising or weakening the support body by removing material to form the recess. For example, recess depth D is approximately 25% of the total axial length E of support body 102.

The relative axial dimensions of tip 101 are also optimised to maximise the mechanical attachment of tip 101 to support body 102. In particular, an axial length A of the generally conical tip forward region 203 is defined between the apex of the domed end 200 and the forwardmost end 300 of waist 214. Additionally, an axial length B of the tip mount portion 204 is defined between circular end surface 212 and a rearward end 301 of waist 214. The total axial length C of tip 101 is accordingly defined between the apex of dome 200 and end surface 212. According to the specific implementation and for optimised mechanical strength when seated within recess 213, axial length A is approximately 58% of axial length C whilst axial length B is approximately 38% of axial length C. Tip waist region 214 includes a generally short cylindrical section representing approximately 5% of the tip total axial length C. Accordingly, approximately 38% of the axial length of tip 101 is accommodated within recess 213 that extends approximately 25% axially rearward into the total length of the support body 102.

The mechanical attachment strength between tip 101 and support body 102 is further optimised by the relative tapering angles of the tip surfaces 201, 202 at the forward region 203 and mount portion 204. According to the specific implementation, an angle σ by which tip surface 201 tapers radially outward from axis 108 is greater than a corresponding angle α by which the cone surface 202 of the tip mount portion 204 tapers radially inward from axis 108. Accordingly, the tip axially forward region 203 is slightly flatter than the more pointed mount portion 204. So as to achieve a closeness-of-fit between the tip mount portion 204 and recess 213, the conical recess sidewall 205 is inclined at the same angle β (relative to axis 108) as angle α. Accordingly, the generally more pointed tip mount region 204 (relative to tip forward region 203) provides a root that is embedded securely within the axially forwardmost region of support body 102.

The mechanical fixation of tip 101 at the support body 102 is provided, in part, by the angled orientation of the recess sidewall 205 relative to base surface 208 that extends perpendicular to axis 108. The tip 101 is therefore effectively wedged in position within recess 213 and is prevented from rotation or pivoting within the truncated conical recess 213. Such an arrangement is advantageous over a part-spherical recess and corresponding part-spherical tip mount portion 204.

An angle by which the sidewall tapers radially inward relative to the central axis can be in the range 10 to 70°, 20 to 40° or 25 to 35°. Such an arrangement provides a wedging effect of the tip within the support body such that the angular disposition of the sidewall relative to the planar base surface prevents the tip from being deflected by lateral loading forces encountered by the tip during use. The angle of the sidewall is also optimised to maintain the structural integrity of the support body immediately surrounding the tip such that the support body does not fracture due to loading and stress forces. An appreciable volume of material of the support body is therefore present around the rearward mount portion of the tip.

Figure 5:
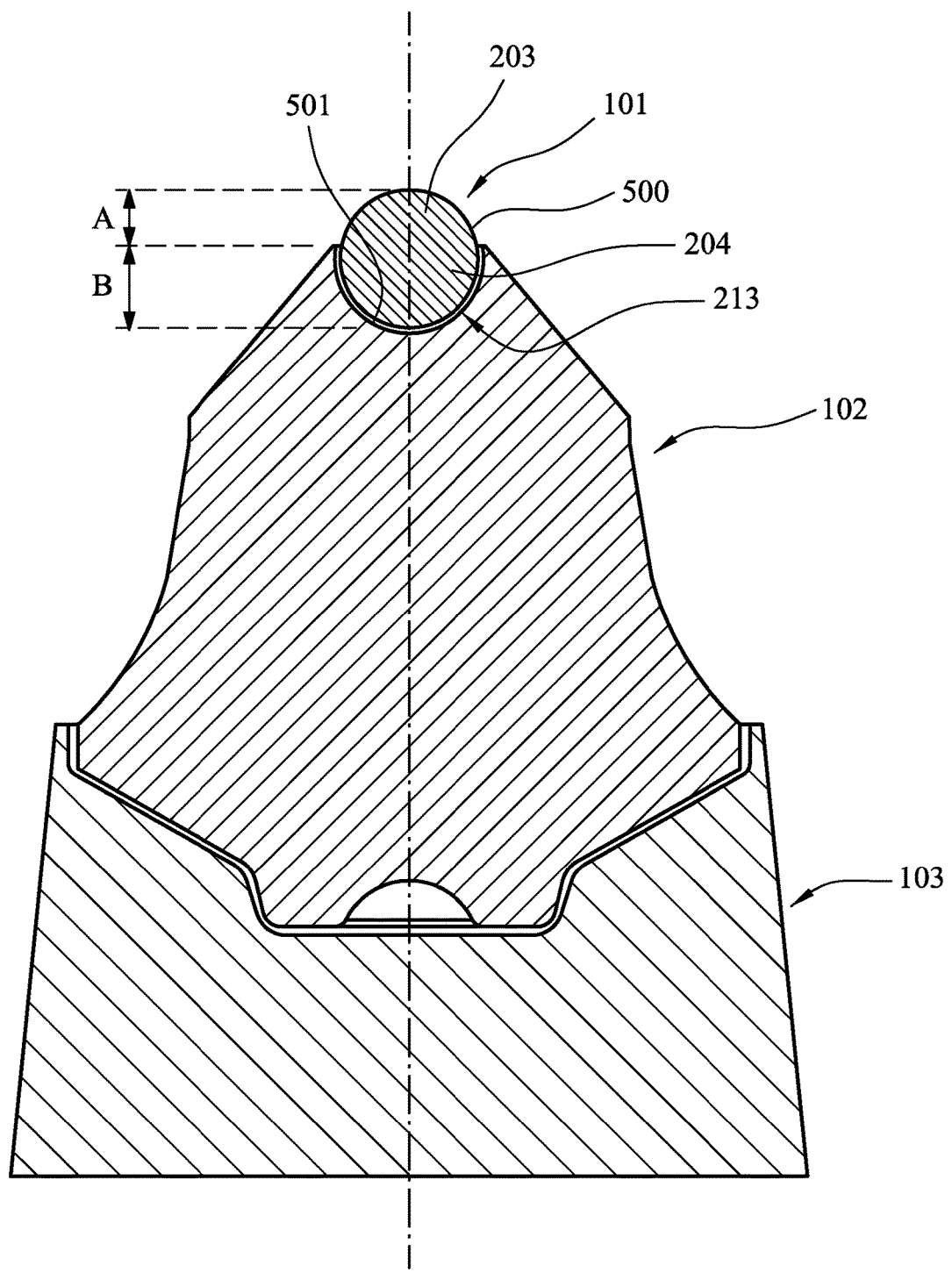
FIG. 5 is a cross-sectional view of the tip region of a cutting tool according to a further embodiment.

FIG. 5 illustrates a further embodiment in which the SCD tip 101 has a spherical shape configuration having an external surface 500. Recess 213 at support body 102 is defined by a part spherical wall surface 501 that is mated against tip surface 500 and bonded by the same braze layer 217 that is described referring to FIGS. 2 to 4. According to the embodiment of FIG. 5, the axial length A of the forward region 203 of tip 101 is smaller than the corresponding axial length B of the tip mount portion 204 that is embedded within recess 213. Stress concentrations within the mount body 102 immediately surrounding recess 213 are minimised due to the part spherical contact surfaces at the region of recess 213. Additionally, and according to the embodiment of FIG. 5, the relative volume of the SCD material of tip 101 is minimised relative to a volume of the cemented carbide support body 102. In particular, a volume of tip 101 is approximately 2 to 10% of the volume of support body 102. A secure bond is achieved by configuring a radius of the spherical tip surface 500 to be approximately equal to a radius of part spherical surface 501.

Figure 6:
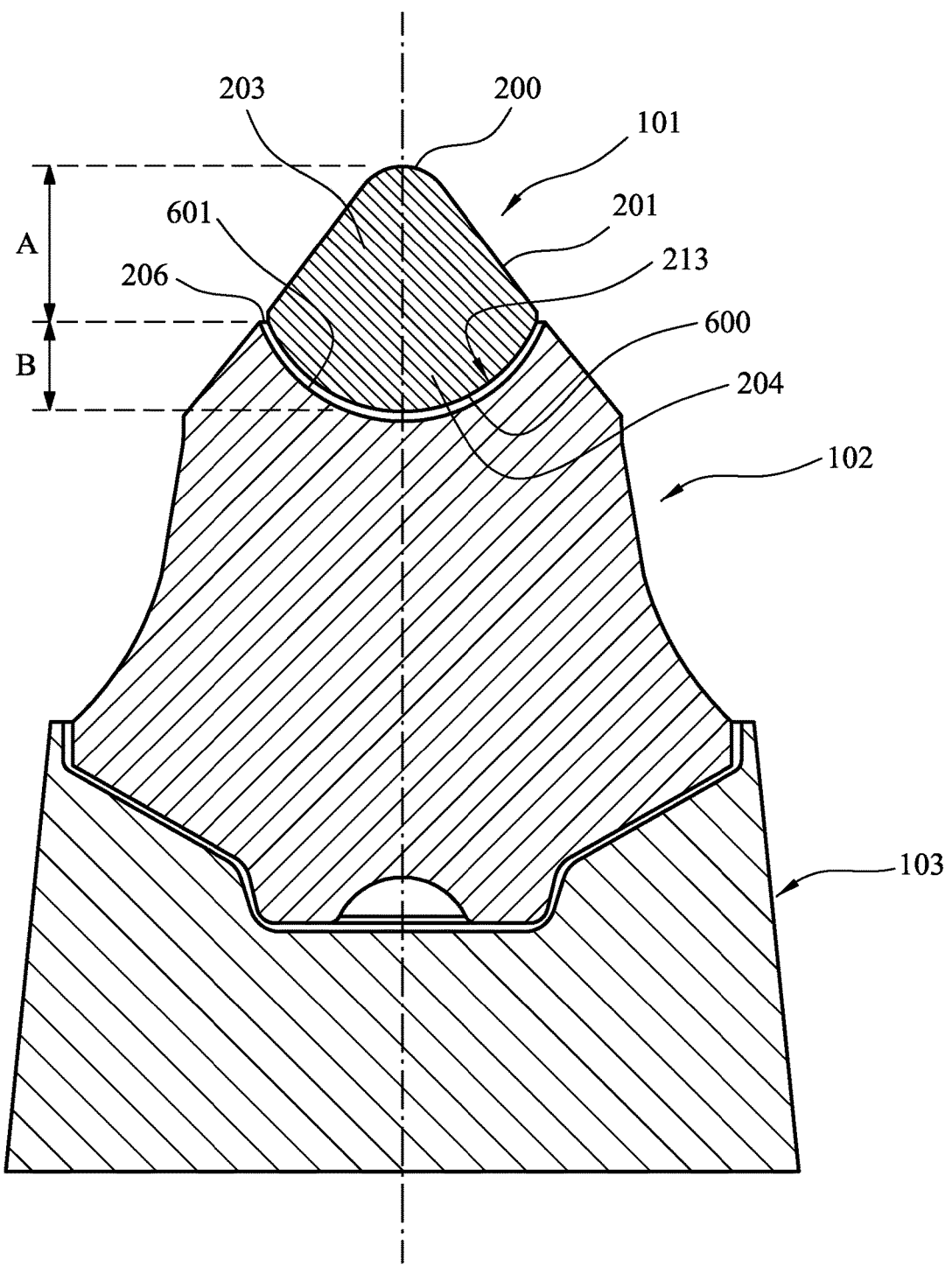
FIG. 6 is a cross-sectional view of the tip region of a cutting tool according to a further embodiment.

FIG. 6 illustrates a further embodiment in which the axially rearward mount portion 204 of tip 101 includes a part spherical shaped configuration whilst the tip forward region 203 has the same domed conical shape profile according to the embodiment of FIGS. 2 to 4. Accordingly, recess 213 is defined by a part spherical surface 601 having a radius approximately equal to a radius of a part spherical tip surface 600.

The arrangement of FIG. 6 is optimised to reduce any weakening of the support body 102 by creation of the recess 213. Accordingly, a relative depth of recess 213 is correspondingly less than recess depth B of the embodiment of FIGS. 2 to 4. Due to the more shallow recess depth, the axial length A by which tip 101 projects forward from the support body rim 206 is greater than the corresponding axial length B by which the tip mount portion 204 is received within recess 213. Stress concentrations within the support body 102 at the region of recess 213 are minimised via the part spherical boundary surfaces 600, 601. Tip 101 is secured to support body 102 via a layer of braze material as described with reference to FIGS. 2 to 4.

Figure 7:
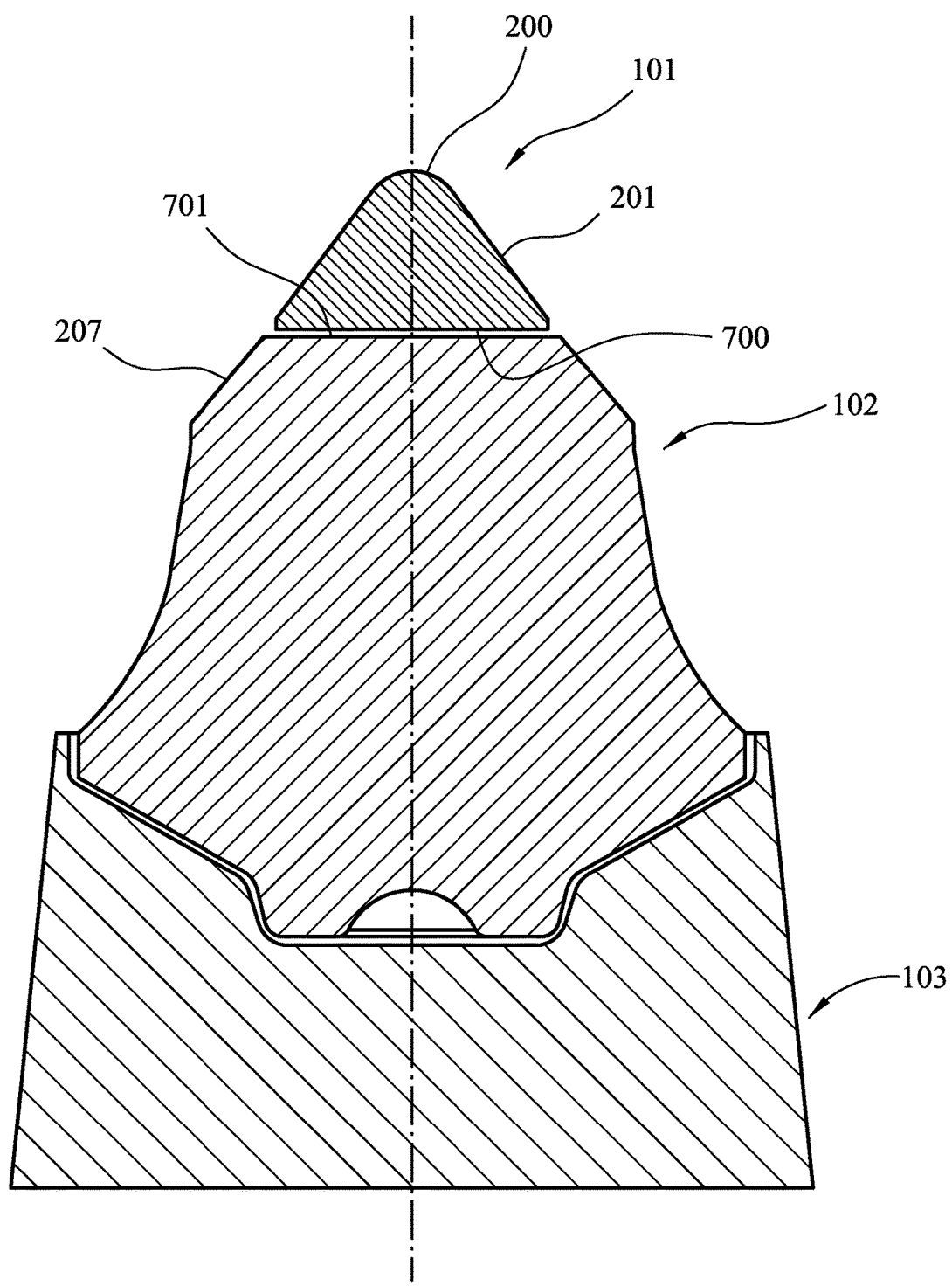
FIG. 7 is a cross-sectional view of the tip region of a cutting tool according to a further embodiment.

FIG. 7 illustrates a further embodiment in which support body 102 does not have the recess 213 of the embodiments of FIGS. 2 to 7 and instead includes a substantially planar axially forwardmost surface 701 that is aligned perpendicular to axis 108. Accordingly, an axially rearward region of the SCD tip 101 is formed by a substantially coplanar surface 700 that is mated against and opposed to support body surface 701. Accordingly, tip 101 has a generally conical shape profile and is not embedded into support body 102. A corresponding braze layer 217 is provided between surfaces 700, 701 as described with reference to FIGS. 2 to 4.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A cutting pick tool comprising:
   a central axis;
   a cutting tip of a diamond composite, the tip having an axially forward region including a first conical external surface and a mount portion extending axially rearward toward the central axis, the mount portion including a substantially planar end surface, wherein a first annular curved section forms a junction between the planar end surface and a second conical external surface of the mount portion; and
   a cemented carbide support body having an axially forward rim and an axially rearward region mounted at a pick body, the support body including an outer surface that extends axially rearward from the forward rim and a recess also extending axially rearward from the forward rim, the mount portion being received and mated within the recess, the recess being defined by a conical sidewall that tapers radially inward in a direction from the forward rim to the rearward region and towards the central axis, an axially rearwardmost region of the recess being defined by a substantially planar base surface, the planar base surface being bordered at its perimeter by a second annular curved section that forms a junction with the conical sidewall, the mount portion having a truncated conical shape profile that is complementary to a profile of the recess to seat the mount portion within the recess, the first annular curved section of the mount portion corresponding to the second annular curved section of the recess and the second conical external surface and planar end surface of the mount portion being arranged in close touching contact with the conical sidewall and the planar base surface of the recess respectively, such that approximately half or just less than half of a volume of the cutting tip is accommodated within the recess, wherein the first external surface of the cutting tip is substantially coplanar with the outer surface of the support body.

2. The tool as claimed in claim 1, wherein an axial depth of the recess in an axial direction of the tool is in a range of 20 to 30% of a total axial length of the support body.

3. The tool as claimed in claim 1, wherein an angle by which the conical sidewall tapers radially inward relative to the central axis is in the range of 10 to 70°.

4. The tool as claimed in claim 3, wherein the range is 20 to 40°.

5. The tool as claimed in claim 3, wherein the range is 25 to 35°.

6. The tool as claimed in a claim 1, wherein the axially forward region of the tip includes a domed apex and is generally conical being defined by the first conical external surface, an angle of the first conical external surface relative to the central axis being at least equal to or greater than an angle by which the conical sidewall of the recess tapers radially inward relative to the central axis.

7. The tool as claimed in claim 1, wherein a rearward end of the conical sidewall terminates at the planar base surface.

8. The tool as claimed in claim 7, wherein the second annular junction is disposed between the rearward end of the conical sidewall and the planar base surface and is curved to provide a gradual transition from the conical sidewall to the planar base surface devoid of an edge or sharp angled portion.

9. The tool as claimed in claim 1, further comprising a bonding braze layer positioned between the cutting tip and the support body.

10. The tool as claimed in claim 1, further comprising a bonding braze layer positioned between the support body and the pick body.

11. The tool as claimed in claim 1, wherein 55 to 65% of the cutting tip projects axially forward from the support body.

12. The tool as claimed in claim 1, wherein the cutting tip includes a waist region disposed between the axially forward region and the mount portion.

13. The tool as claimed in claim 12, wherein the mount portion of the cutting tip has an axial length that extends between the planar end surface and a rearward end of the waist portion, the axial length of the mount portion being located within the recess.

14. A method of manufacturing a cutting pick tool comprising:
   forming a diamond composite into a cutting tip, the cutting tip having an axially forward region including a first conical external surface and a mount portion extending axially rearward, the mount portion including a substantially planar end surface, wherein a first annular curved section forms a junction between the planar end surface and a second conical external surface of the mount portion;
   providing a cemented carbide support body having an axially forward rim and an axially rearward region, the axially rearward region being mounted at a pick body, the support body including an outer surface that extends axially rearward from the axially forward rim and a recess also extending rearwardly from the axially forward rim and having a shape and configuration to receive the mount portion, such that approximately half or just less than half of a volume of the cutting tip is accommodated within the recess;
   forming the recess with a conical sidewall that tapers radially inward towards a central axis of the tool in a direction from the axially forward rim to the axially rearward region, an axially rearwardmost region of the recess being defined by a substantially planar base surface, the planar base surface being bordered at its perimeter by a second annular curved section that forms a junction with the conical sidewall;
   positioning the mount portion of the tip within the recess, the first conical external surface of the tip being substantially coplanar with the outer surface of the support body, the first annular curved section of the mount portion corresponding to the second annular curved section of the recess and the second conical external surface and planar end surface of the mount portion being arranged in close touching contact with the conical sidewall and planar base surface of the recess respectively; and bonding the tip to the support body by brazing.

15. The method as claimed in claim 14, further comprising bonding the support body to the pick body by brazing.

16. A cutting machine comprising a plurality of pick tools, each of the picking tools including
- a cutting tip of a diamond composite, the tip having an axially forward region including a first conical external surface and a mount portion extending axially rearward, the mount portion including a substantially planar end surface, wherein a first annular curved section is provided at a junction between the planar end surface and a second conical external surface of the mount portion; and
- a cemented carbide support body having an axially forward rim and an axially rearward region mounted at a pick body, the support body including an outer surface that extends axially rearward from the axially forward rim and a recess extending axially rearward from the axially forward rim, the mount portion being received and mated within the recess, wherein the recess is defined by a conical sidewall that tapers radially inward in a direction from the axially forward rim to the axially rearward region and towards a central axis, an axially rearwardmost region of the recess being defined by a substantially planar base surface, the planar base surface being bordered at its perimeter by a second annular curved section that forms a junction with the conical sidewall, the mount portion having a truncated conical shape profile that is complementary to a profile of the recess to seat the mount portion within the recess, the first annular curved section of the mount portion corresponding to the second annular curved section of the recess and the second conical external surface and planar end surface of the mount portion being arranged in close touching contact with conical sidewall and planar base surface of the recess respectively, such that approximately half or just less than half of a volume of the cutting tip is accommodated within the recess, wherein the first external surface of the cutting tip is substantially coplanar with the outer surface of the support body.

* * * * *